H. J. GILBERT.
PULLEY.
APPLICATION FILED MAY 23, 1904.
955,864.
Patented Apr. 26, 1910.
2 SHEETS—SHEET 1.
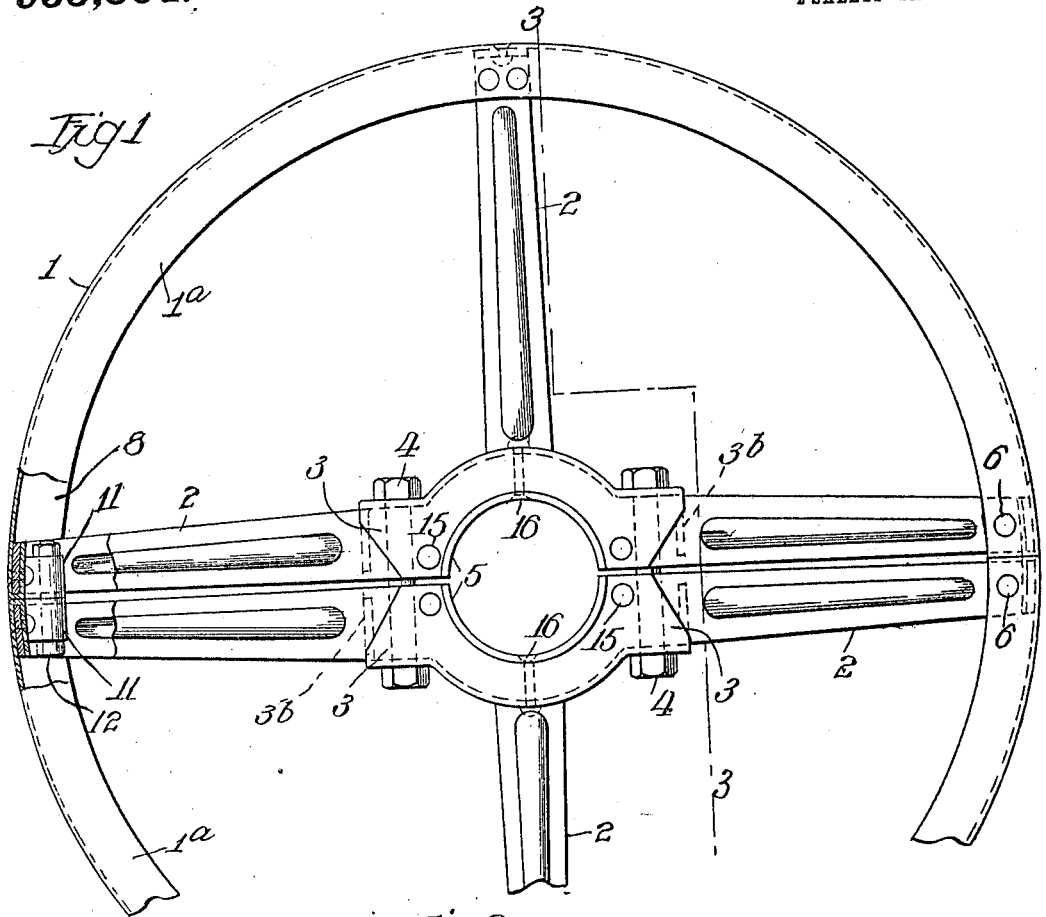
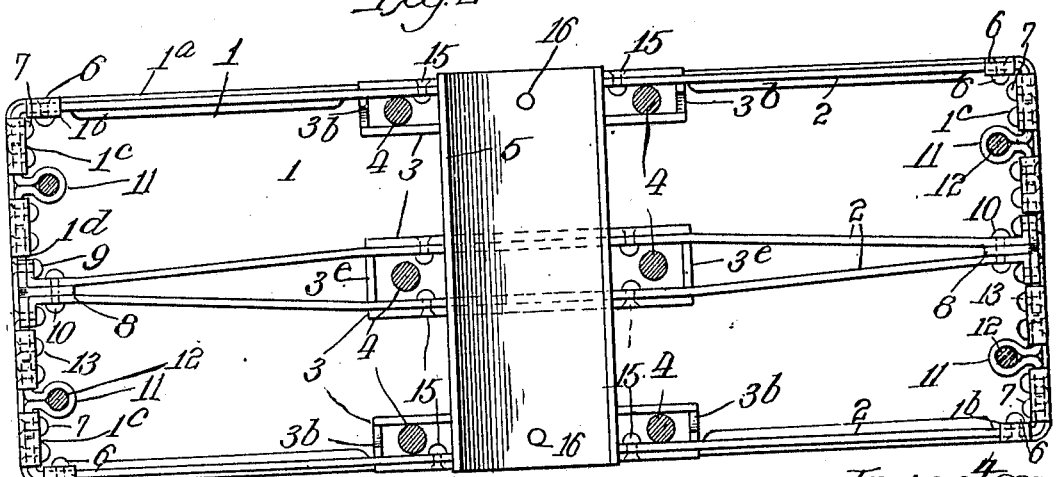

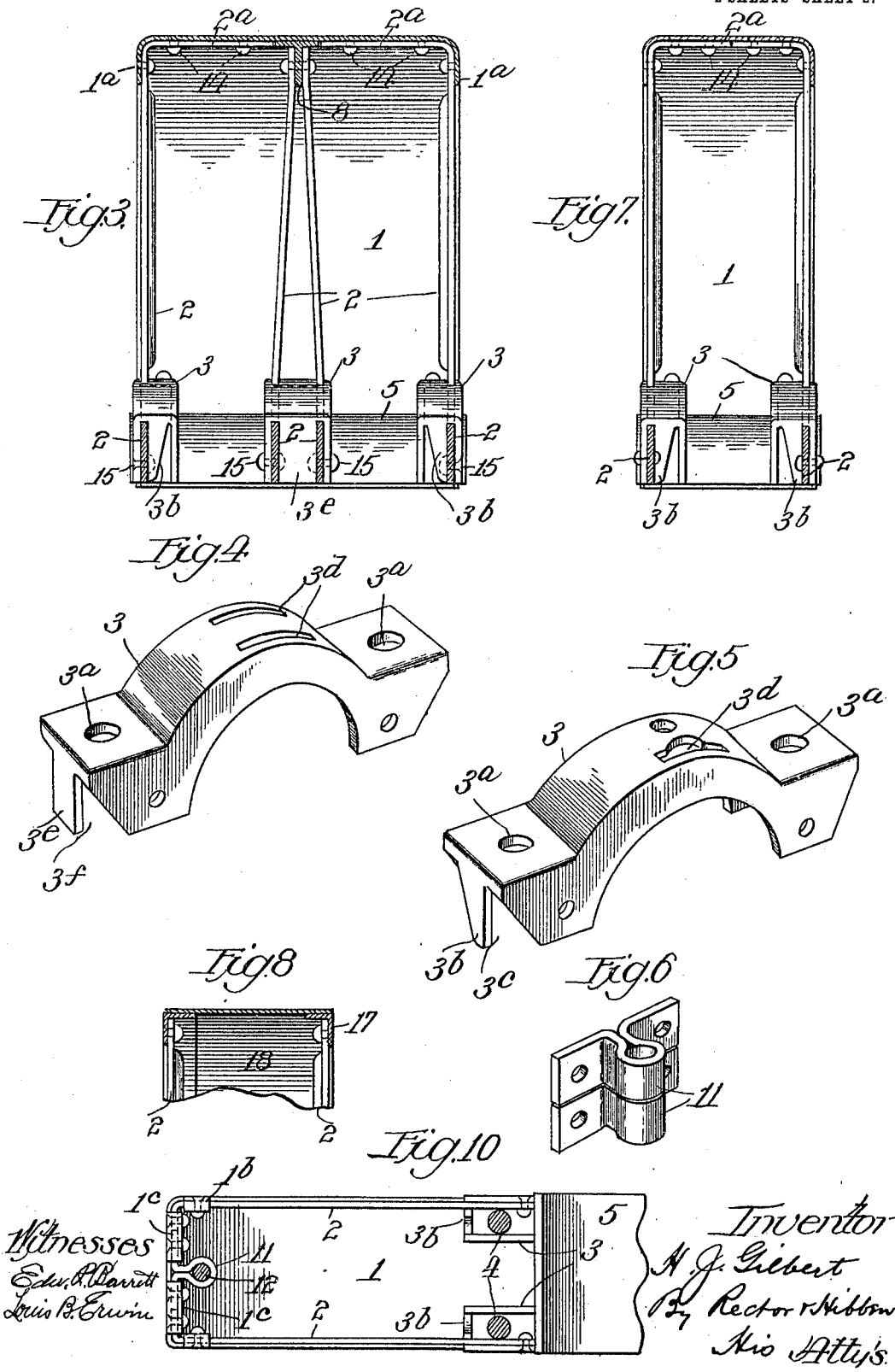

UNITED STATES PATENT OFFICE.

HENRY J. GILBERT, OF SAGINAW, MICHIGAN.

PULLEY.

955,864.  Specification of Letters Patent.  Patented Apr. 26, 1910.

Application filed May 23, 1904. Serial No. 209,337.

*To all whom it may concern:*

Be it known that I, HENRY J. GILBERT, a citizen of the United States, residing at Saginaw, in the county of Saginaw and State of Michigan, have invented certain new and useful Improvements in Pulleys, of which the following is a specification.

My invention has relation to pulleys, more particularly of the split type, and the object thereof is to produce from sheet metal a pulley which shall be simple and economical of manufacture and durable and efficient in use.

The various features of advantage and utility possessed by my improved pulley will be apparent from the description hereinafter given.

In the drawings, Figure 1 is a side elevation of my improved pulley; Fig. 2 a plan view of one of the pulley halves; Fig. 3 a section on line 3 of Fig. 1; Fig. 4 a perspective of one of the middle hub sections; Fig. 5 a perspective of one of the outer hub sections; Fig. 6 a perspective of a pair of rim clamps; Fig. 7 a section of a half of a narrow-faced pulley; Fig. 8 a detail view illustrating a modified form of connection between the rim and spoke; Fig. 9 a view illustrating another form of narrow-faced pulley, and Fig. 10 a bottom plan of the pulley half of Fig. 7.

Corresponding parts are indicated by the same reference characters throughout the several views.

My improved pulley, as herein shown, comprises essentially the rim segments 1, spoke arms 2 connected at their ends therewith and the hub sections 3, together with the clamping bolts 4 for clamping the spoke arms and hub sections together and upon the shaft. If desired and, as herein shown, a split hub thimble 5 may be employed in the shaft opening formed by the hub sections.

The number of sets of spoke arms used is dependent upon the width of pulley face and upon the diameter, or upon the strength desired, and in the present instance I have shown my invention embodied in both a wide and a narrow faced pulley.

In the drawings, Figs. 1, 2 and 3 illustrate the wider-faced pulley with four separate sets of spoke arms, two outer sets and two middle sets, arranged between the outer sets, and all coöperating with the same hub thimble, while Fig. 7 illustrates the narrower-faced pulley with the narrower rim and having the outer sets of spoke arms only.

By preference, the spoke arms belonging to each rim segment or pulley half are formed from a single piece of sheet metal which is properly cut and then folded and shaped at its central portion so as to form the shaft opening thereat, and also to bring the three spoke arms to a radial position and at right angles to each other. These spoke arms, which are preferably corrugated or ribbed for the sake of strength, are substantially flat bars, and are connected together by a central hub portion.

Referring more particularly to Figs. 1, 2 and 3, the rim is provided with inturned peripheral flanges $1^a$ which form the medium of connection of the outer sets of spoke arms with the rim. In the present instance, and as clearly shown in Fig. 2, these rim flanges are provided at their ends with tongues $1^b$ which are inturned and reversely folded to form sockets to receive the outer spoke arms whose extreme ends are laterally bent and engage similar sockets formed by the inturned tongues $1^c$ of the rim. These spoke arms are secured in their sockets $1^b$ by the rivets 6 and in their sockets $1^c$ by rivets 7.

To provide means of connection for the middle sets of spoke arms and also to strengthen the rim, a T-iron 8 is arranged on the inner face of the rim midway of its edges and secured thereto in suitable manner, as by rivets 9. The outer ends of the spoke arms comprised in the middle sets thereof are secured to the web or stem of the T-iron by rivets 10 and the extreme ends thereof are bent laterally at right angles so as to rest upon the flanges of the T-iron and be secured thereto by the said rivets 9.

The novel rim clamps which I employ and which are clearly illustrated in Fig. 6, comprise a pair of plates 11, at each of the adjoining meeting ends of the rim segments, one plate being secured to each meeting end thereof. These plates are folded at their middle to form a tubular portion to receive the clamping bolt 12, while the ends of such plates are laterally and oppositely flanged or folded.

In the narrow-faced pulley of Figs. 7 and 8, a single set of these rim clamps is employed, but for the wider-faced pulley of Figs. 1, 2 and 3, two sets thereof are employed and arranged intermediate the T-iron and the edges of the rim, as indicated in Fig. 2. In both cases, the flanged ends of the rim clamp are secured to the rim and by preference are interlocked therewith by the same tongues 1$^c$ which formed sockets for the flanged ends of the outer sets of spoke arms and by the additional tongues 1$^d$ on the rim. Rivets 13 passed through the tongues 1$^d$ and the flanged ends of the rim clamps serve to fasten the parts together and to the rim.

In the narrow-faced pulley, the particular spoke arms which are connected with the rim segments intermediate their meeting ends have their end flanges 2$^a$ somewhat longer than the other spoke arms, the latter extending as far as the T-iron as in the case of the wider faced pulley (Fig. 3). In the case of the narrower faced pulley, these flanges of two corresponding spoke arms on opposite sides of the pulley may substantially abut as seen in Fig. 7. These particular spoke arms are secured to the rim by rivets 14.

The hub sections 3 for the different sets of spoke arms are substantially the same in general construction and function, but are somewhat different as to size and specific construction, inasmuch as the middle hub sections are made to accommodate two sets of spoke arms (Fig. 4) and the outer ones to accommodate a single set thereof (Fig. 5).

Referring first to one of the outer hub sections as illustrated in Fig. 5, the same are made of sheet metal and are formed approximately U-shaped with a centrally expanded or curved portion to form the shaft opening or to fit upon a hub thimble when the latter is employed. The clamping bolts 4 are arranged to pass through the holes 3$^a$ on either side of the shaft opening of such hub sections. The ends of these hub sections have projecting tongues 3$^b$ which are folded inwardly and so formed as to provide slots 3$^c$ for those spoke arms which are connected with the rim segments at their meeting ends. These slots serve to support and hold these spoke arms in proper place and position. The third spoke arm of each set extends through the slot 3$^d$ cut in the expanded portion of the hub section. It will be understood that two of these hub sections are fitted over the spoke arms of each of the outer sets of spoke arms and adapted to form the shaft opening between or to be saddled upon a hub thimble if employed. The parts when thus assembled are held or clamped together by the clamping bolts 4.

The hub sections employed for the middle sets of spoke arms are the same as those already described with the exception of the provision of rectangular end flanges 3$^e$ which when folded down in place form two parallel slots 3$^f$ to receive the parallel spoke arms of the middle set of such arms and with the further exception that the slots 3$^d$ as shown in Fig. 4 have straight sides inasmuch as their spoke arms have no corrugations to be accommodated as in respect to the other spoke arms. These tongues 3$^b$ and 3$^e$ are desirable and preferable to increase the strength and rigidity of support of the spoke arms at the hub portion but it will be understood that the same might be dispensed with and entire reliance for support placed on the body of the hub clamps.

The hub sections may, if desired, be secured to the spoke arms by means of the transverse sets of rivets 15. Moreover, when a hub thimble is employed, the same is, by preference, secured to the hub sections by rivets 16, Figs. 1 and 2.

As illustrated in Fig. 7, a narrow-faced pulley is formed by omitting the middle sets of spoke arms and hub sections and narrowing the rim, but, as shown in Fig. 8, the middle sets of spoke arms and hub sections may be retained and the outer sets omitted, in making such type or class of pulley.

So far as the main features of my invention are concerned, it is immaterial whether the rim flanges to which the outer sets of spoke arms are connected are formed integral with the rim or not, inasmuch as such flanges or means of attachment for the spoke arms may be formed by the angle iron 17 secured to the plain rim 18, as illustrated in Fig. 8. Furthermore, it will be understood that so far as the spoke construction and the hub construction, hereinbefore described, are concerned, the rim connection may or may not be of an interlocking character, such as referred to, inasmuch as, indeed, the spoke and hub constructions may be embodied in a pulley having the meeting ends of each segment made plain, that is arranged to abut end to end with the opposite or adjacent ends of the companion segment.

I claim:

1. A pulley comprising a rim, spoke arms connected therewith at their outer ends, and hub sections, each comprising substantially U-shaped pieces fitting upon the spoke arms and having separate slots receiving and supporting their respective spoke arms, each slot being of a size to closely fit all sides of the spoke arm which it receives; substantially as described.

2. A pulley comprising a rim, spoke arms connected therewith at their outer ends, and hub sections, each comprising substantially U-shaped pieces having inwardly directed end tongues forming separate parallel slots to receive and support the spoke arms; substantially as described.

3. A pulley comprising a rim, spoke arms connected therewith at their outer ends, and hub sections, each comprising substantially U-shaped pieces arranged to fit over the inner ends of the spoke arms and having inwardly directed end tongues forming separate parallel slots to receive and support the ends of the spoke arms; substantially as described.

4. A pulley comprising a rim, main spoke arms connected therewith at their outer ends and extending substantially diametrically of the pulley, supplemental spoke arms, hub sections, each of which comprises substantially U-shaped pieces having slots adapted to receive and to closely fit against all faces of the supplemental spoke arms, and means for securing the hub sections to the spoke arms; substantially as described.

5. A pulley comprising a rim, spoke arms connected therewith at their outer ends, and hub sections, each comprising substantially U-shaped pieces arranged to fit over the inner ends of the spoke arms and having inwardly directed end tongues forming separate parallel slots to receive and support the inner ends of the spoke arms, said hub sections and spoke arms being secured together; substantially as described.

6. A pulley comprising a rim, spoke arms connected therewith at their outer ends, and hub sections, each comprising pieces substantially U-shape in cross section having an expanded central portion for the shaft opening, each of said sections having separate end slots and a top slot in the expanded portion to receive the spoke arms, said top slot closely fitting against all faces of the spoke arms received by it; substantially as described.

7. A pulley comprising a rim, spoke arms connected therewith at their outer ends, and hub sections, each comprising pieces substantially U-shape in cross section having an expanded central portion for the shaft opening, each of said sections having a pair of slots at each end and a pair of top slots in its expanded portion to receive the spoke arms; substantially as described.

8. A pulley comprising a rim, spoke arms connected therewith at their outer ends, and hub sections, each comprising pieces substantially U-shape in cross section having an expanded central portion for the shaft opening, each of said sections having at each end inturned tongues forming at each end a pair of parallel slots to receive and support the spoke arms; substantially as described.

9. A pulley comprising a rim, spoke arms connected therewith at their outer ends, hub sections, each comprising pieces substantially U-shape in cross section having an expanded central portion for their shaft opening, each of said sections having central inwardly directed end tongues engaging the spoke arms, and a hub thimble secured to said sections; substantially as described.

10. A pulley comprising a rim, spoke arms connected therewith at their outer ends, and hub sections, each comprising pieces substantially U-shape in cross section having an expanded central portion for their shaft opening, each of said sections having separate slots engaging the spoke arms respectively, in combination with clamping bolts passed through a pair of said sections, each slot being of a size to separately receive and support its spoke arms; substantially as described.

11. A pulley comprising a rim having inturned peripheral flanges, two sets of diametrically extending spoke arms connected at their outer ends with said flanges respectively, two pairs of hub sections engaging the inner ends of the spoke arms, each hub section comprising a U-shaped piece having separate slots to receive the spoke arms, each slot being of a size to closely fit and thereby support its spoke arm, and means for clamping together the sections of each pair; substantially as described.

12. A pulley comprising a rim having inturned peripheral flanges, two outer sets of spoke arms connected at their outer ends with said flanges respectively, two inner sets of spoke arms connected at their outer ends with said rim, and pairs of hub sections connected with the inner ends of said spoke arms, each hub section comprising a U-shaped piece having separate slots to receive its spoke arms respectively, and means for clamping together the hub sections of each pair, each slot being of a size to separately receive and support its spoke arm; substantially as described.

13. A pulley comprising rim segments, having at their meeting ends and margins inturned portions forming sockets, two sets of spokes for each segment, each set comprising a plurality of spoke arms radiating from a common hub portion, the outer ends of such spoke arms being interlocked with said sockets of the rim segments, and hub sections coöperating with said spoke arms and hub portion; substantially as described.

14. Rim clamps for sectional pulleys comprising, in combination with the rim segments, having infolded tongues forming sockets, plates arranged at each of the meeting ends of the segments, each plate being folded at its middle to form a tubular portion to receive clamping bolts, and having their ends engaged by the said sockets and thereby interlocked with the rim segments, and clamping bolts passed through adjoining clamps; substantially as described.

15. Rim clamps for sectional pulleys comprising, in combination with the rim segments having infolded tongues forming sockets, plates arranged at each of the meeting ends of the segments, each plate being folded at its middle to form a tubular portion to receive clamping bolts and having their ends engaged by the said sockets and thereby interlocked with the rim segments, said ends of the clamps being also secured to the infolded ends of the rim segments and to such segments, and clamping bolts passed through adjoining clamps; substantially as described.

HENRY J. GILBERT.

Witnesses:
S. E. HIBBEN,
LOUIS B. ERWIN.